United States Patent [19]

Jayant

[11] Patent Number: 5,826,227
[45] Date of Patent: Oct. 20, 1998

[54] HIDING A SOURCE IDENTIFIER WITHIN A SIGNAL

[75] Inventor: Nuggehally Sampath Jayant, Gillette, N.J.

[73] Assignee: Lucent Technologies Inc., Murray Hill, N.J.

[21] Appl. No.: 573,738

[22] Filed: Dec. 18, 1995

[51] Int. Cl.⁶ .................................. G10L 3/02; G10L 9/00
[52] U.S. Cl. .............................................. 704/229; 704/226
[58] Field of Search .......................... 395/2.1, 2.35–2.37, 395/2.38, 2.39, 2.91

[56] References Cited

U.S. PATENT DOCUMENTS

| | | | |
|---|---|---|---|
| 4,516,241 | 5/1985 | Farah et al. | 370/110.1 |
| 5,282,197 | 1/1994 | Kreitzer | 370/76 |
| 5,285,498 | 2/1994 | Johnston | 381/2 |
| 5,319,735 | 6/1994 | Preuss et al. | 395/2.14 |
| 5,341,457 | 8/1994 | Hall, II et al. | 395/2.35 |
| 5,367,608 | 11/1994 | Veldhuis et al. | 395/2.38 |
| 5,463,641 | 10/1995 | Dorward et al. | 371/374 |
| 5,491,773 | 2/1996 | Veldhuis et al. | 395/2.38 |

*Primary Examiner*—David R. Hudspeth
*Assistant Examiner*—Patrick N. Edouard
*Attorney, Agent, or Firm*—Joseph J. Opalach

[57] ABSTRACT

A digital audio broadcasting system incorporates a perceptual audio coder that encodes a digital audio signal for broadcast. A "source label" is provided by controlling the perceptual audio coder in such a way that the number of coefficient samples, n, used in each transmission frame represents information about the source. For example, if the value of n is odd, then a binary "1" is transmitted, but if the value of n is even, then a binary "0" is transmitted. As a result, a low-bit rate "source label" is transmitted over a number of frames. In a receiver, the source of the digital audio signal is identified by simply monitoring the value of n over the number of frames. More importantly, the value of n in each frame is required by a corresponding perceptual audio decoder, in the receiver, to correctly recover the digital audio signal. As a result, the "source label" is inseparable from the encoded digital audio signal since any tampering of the value of n after transmission distorts not only the "source label" but affects the recovery of the digital audio signal as well.

43 Claims, 4 Drawing Sheets

HIDING A SOURCE IDENTIFIER WITHIN A SIGNAL

BACKGROUND OF THE INVENTION

The present invention relates to communications systems and, more particularly, to the transmission and identification of information.

Compressing techniques such as perceptual audio coding provide ways to efficiently transmit high-quality digital signals using a smaller bandwidth or storage size than the larger-sized original digital signal. As a result, it becomes easier to distribute, or copy, high-quality digital signals without regard to ownership or distribution rights. Indeed, as the distribution of information and entertainment signals over networks becomes pervasive and commercially valuable the ability to track source and ownership becomes essential.

As such, it would be desirable if a "source label" could be attached to a compressed information signal, whether that signal is transmitted for broadcast or simply copied from one storage medium to another. The "source label" could be a number of binary digits (bits), e.g., 10 to 20 bits, that provides source and ownership information. Subsequent processing of the compressed information signal, e.g., in a receiver, would not only yield the respective original information and/or entertainment signals but would also provide a positive acknowledgment, via the "source label," of the owner, or distributor, of the information.

One method of providing a "source label" is to multiplex the "source label" with the compressed information signal. This technique requires spare bandwidth to accommodate the "source label." Unfortunately, a multiplexing technique is easy to defeat, e.g., a receiver could simply strip away the "source label" and leave the compressed information signal free for further distribution.

SUMMARY OF THE INVENTION

Therefore, and in accordance with the invention, I have discovered a way to put a "source label," e.g., a trace or signature, on a compressed signal such that the "source label" is inseparable from, or embedded within, the data representing the compressed information signal. As a result, any attempt to remove the "source label" affects the ability to recover the original information signal.

In an embodiment of the invention, a digital audio broadcasting system incorporates a perceptual audio coder that encodes a digital audio signal for broadcast. A "source label" is provided by controlling the perceptual audio coder in such a way that the number of coefficient samples, n, used in each transmission frame represents information about the source. For example, if the value of n is odd, then a binary "1" is transmitted, but if the value of n is even, then a binary "0" is transmitted. As a result, a low-bit rate "source label" is transmitted over a number of frames. In a receiver, the source of the digital audio signal is identified by simply monitoring the value of n over the number of frames. More importantly, the value of n in each frame is required by a corresponding perceptual audio decoder, in the receiver, to correctly recover the digital audio signal. As a result, the "source label" is inseparable from the encoded digital audio signal since any tampering of the value of n after transmission distorts not only the "source label" but affects the recovery of the digital audio signal as well.

DETAILED DESCRIPTION

Perceptual audio coding is well-known and will not be described in detail. To simplify the present disclosure, U.S. Pat. No. 5,285,498, entitled "Method and Apparatus for Coding Audio Signals Based on Perceptual Model," issued Feb. 8, 1994 to Johnston (the '498 patent), is hereby incorporated by reference. Other such techniques are described, e.g., in J. P. Princen and A. B. Bradley, "Analysis/Synthesis Filter Bank Design Based on Time Domain Aliasing Cancellation," IEEE Trans. ASSP, Vol. 34, No. 5, Oct. 1986; E. F. Schroder and J. J. Platte, "MSC : Stereo Audio coding with CD-Quality and 256 kBIT/SEC," IEEE Trans. on Consumer Electronics, Vol. CE-33, No. 4, Nov. 1987; Johnston, "Transform Coding of Audio Signals Using Noise Criteria," IEEE J.S.C.A., Vol. 6, No. 2, Feb. 1988; and U.S. Pat. No. 5,341,457, entitled "Perceptual Coding of Audio Signals," issued Aug. 23, 1994 to Hall et al.

Figure 1:
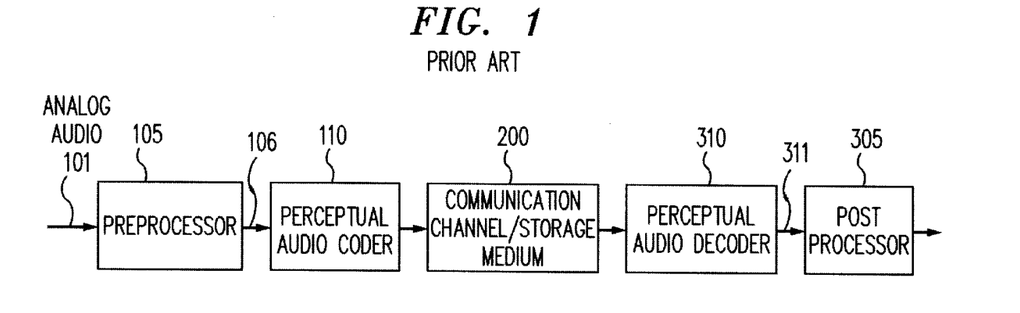
FIG. 1 is a block diagram of a perceptual audio coding system of the prior art.

FIG. 1 is a block diagram of a communications system useful for incorporating an illustrative embodiment of the present invention. At the level shown, the system of FIG. 1 illustrates systems known in the prior art, but modifications, and extensions described herein, will make clear the contributions of the present invention. For illustration, it is assumed that FIG. 1 represents a digital audio broadcasting system. In FIG. 1, an analog audio signal 101 is fed into preprocessor 105 where it is sampled (typically at 48 Khz) and converted into a digital pulse code modulation (PCM) signal 106 (typically 16 bits) in standard fashion. The PCM signal 106 is fed into a perceptual audio coder (PAC) 110, which compresses the PCM signal and outputs the compressed PAC signal to a communications channel/storage medium 200. Although not shown, the compressed PAC signal can be further quantized and coded using traditional coding practices as known in the art, e.g., by the use of Huffman coding, before application to communications channel/storage medium 200. From the communications channel/storage medium the compressed PAC signal is fed into a perceptual audio decoder 310, which decompresses the compressed PAC signal and outputs a PCM signal 311. The latter is fed into a post-processor 305, which creates an analog representation that is, ideally, identical to analog audio signal 101.

In general, PAC 110 operates by sampling PCM signal 106 in the frequency domain and representing this signal by a sequence of transform values, or parameters, say by N spectral coefficients, or samples. For example, 1024 samples are taken over a frequency bandwidth of 0 to 20 Khz. Typically, based on perceptual criteria, a subset of n (where n<<N) samples are saved for transmission over a frame interval (described below), and these n samples are appropriately quantized using coefficient-specific resolutions. In general, N is a power of 2 (such as 64, 256, or 1024) and n is equally likely to be odd or even. As a result of the perceptual criteria, the subset n is time-varying, i.e., in each frame interval the number of samples, n, is determined anew.

Figure 2:
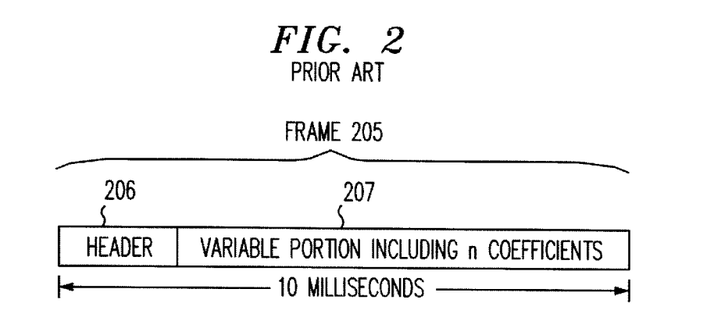
FIG. 2 is an illustrative prior art transmission or storage format.

Notwithstanding the fact that the number of samples, n, is time-varying, it is assumed that PAC 110 generates a fixed number of bits over an interval of time, i.e., PAC 110 is a constant-bit rate coder. For example, it is assumed that PAC 110 is run at 128 kilo-bits/second (kbit/sec.) and uses 10 milli-second (msec.) size frames, each frame comprising 1,280 bits. An illustrative, and simplified, frame format is shown in FIG. 2. Frame 205 is divided into two portions: a fixed header portion 206 and a variable portion 207. The latter includes the above-mentioned n time-varying subset of samples, or coefficients, and the former includes information, e.g., the value of n, so that perceptual audio decoder 310 can identify the location and the number of coefficients within each variable portion of each frame.

Since PAC 110 is a constant-bit rate coder and the number of coefficients, n, varies each frame, the design of PAC 110 includes a rate-control loop processor (not shown) such as described in the above-referenced '498 patent. The rate-control loop processor (not shown) within PAC 110 further adjusts the number of samples, n, to approximately fit within the fixed size of each frame for transmission. Consequently, the rate-control loop processor may increase the resolution in some frames (i.e., increase the number of coefficients transmitted and, therefore, increase the value of n) and decrease the resolution in others (i.e., decrease the number of coefficients transmitted and, therefore, decrease the value of n) to accommodate the fixed frame size. Bit-stuffing is used where appropriate to fill out each frame to its predefined size.

Figure 3:
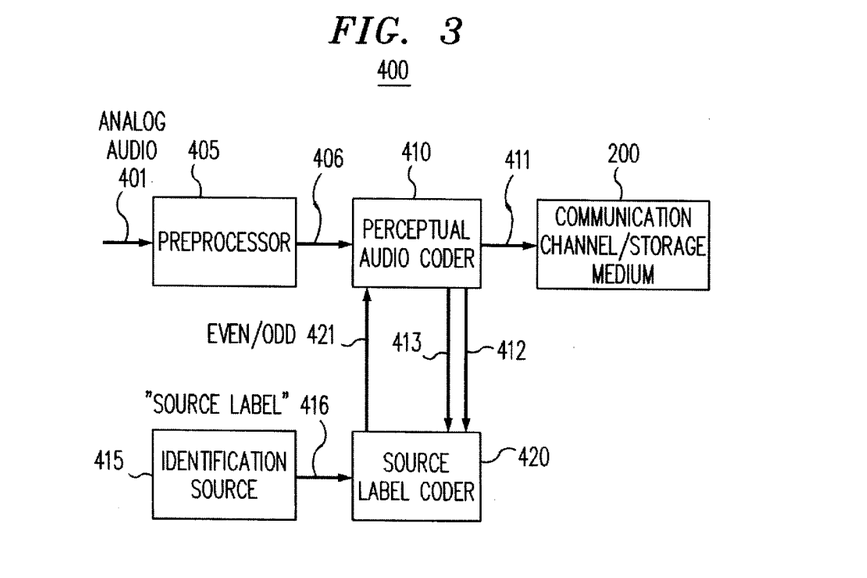
FIG. 3 is an illustrative block diagram of a transmitter, or source, apparatus embodying the principles of the invention.

Compressing techniques such as the above-described perceptual audio coding provide ways to efficiently transmit high-quality digital signals using a smaller bandwidth or storage size than the larger-sized original digital signal. As a result, it becomes easier to distribute, or copy, high-quality digital signals without regard to ownership or distribution rights. Therefore, and in accordance with the invention, I have discovered a way to integrate a "source label" into a data signal so that the "source label" is a relatively inseparable part of the data signal as it is distributed or copied or retransmitted. In the following illustrative embodiment, the inventive concept is shown in the context of the above-described perceptual audio coding system of FIG. 1. However, it should be understood that the inventive concept is applicable to the protection of any type of data independent of whether the data represents text, audio, video, etc., or combinations thereof, i.e., "multi-media signals." FIG. 3 is a block diagram of a source apparatus, or transmitter, 400 embodying the principles of the invention. Source apparatus 400 includes a number of functional building blocks, e.g., a source label coder. The functions of any one or more of these building blocks can be carried out using one or more appropriately programmed processors. Except for the inventive concept, source apparatus 400 functions as in the prior art, as described above. That is, an analog audio signal 401 is fed into preprocessor 405 where it is sampled (typically at 48 Khz) and converted into a digital pulse code modulation (PCM) signal 406 (typically 16 bits) in standard fashion. The PCM signal 406 is then fed into a perceptual audio coder (PAC) 410, which compresses the PCM signal and outputs the compressed PAC signal to a communications channel/ storage medium 200. The compressed PAC signal is transmitted in a sequence of frames, each frame of 10 msec. duration and carrying a predefined number of bits, e.g., 1,280 bits of data. In each frame, a time-varying number, n, of samples or coefficients are transmitted representing the compressed PAC signal.

However, and in accordance with the principles of the invention, the time-varying number of samples, n, is used to additionally represent a "source label." In this proposed technique, a single bit of additional information is transmitted in each frame by illustratively defining the following association, or codebook:

if the value of n is even, then a binary "0" is transmitted; and if the value of n is odd, then a binary "1" is transmitted.

As described further below, the rate-control loop processor within PAC 410 appropriately forces the time-varying number of samples, n, to be either even or odd, in response to a control signal from source label coder 420. At this time, reference should also be made to FIG. 4, which is an illustrative flow diagram of a method for use in the apparatus of FIG. 3.

Figure 4:
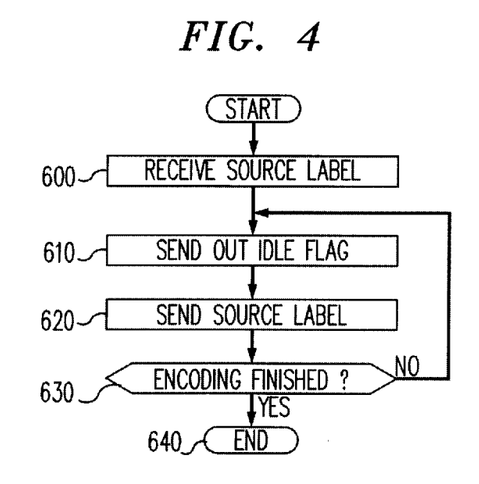
FIG. 4 is a flow diagram of an illustrative method for use within the apparatus of FIG. 3 in accordance with the principles of the invention.

At the start of an encoding operation, source label coder 420 receives the "source label" from identification source 415 in step 600. Identification source 415 is representative of any method or apparatus for generating a sequence of binary ones and zeroes, the pattern of which is predefined to be associated with a particular source. For simplicity, identification source 415, in this example, is simply a memory device that stores a predefined "source label," which is accessed by source label coder 420 via signaling 416. For illustrative purposes, the "source label" is L bits in length, where L is equal to 10, and is equal to "1100110011," which could be predefined as being associated with, e.g., "AT&T." Any number of known methods can be used to store the "source label" in identification source 415, and will not be described herein.

Figure 5:
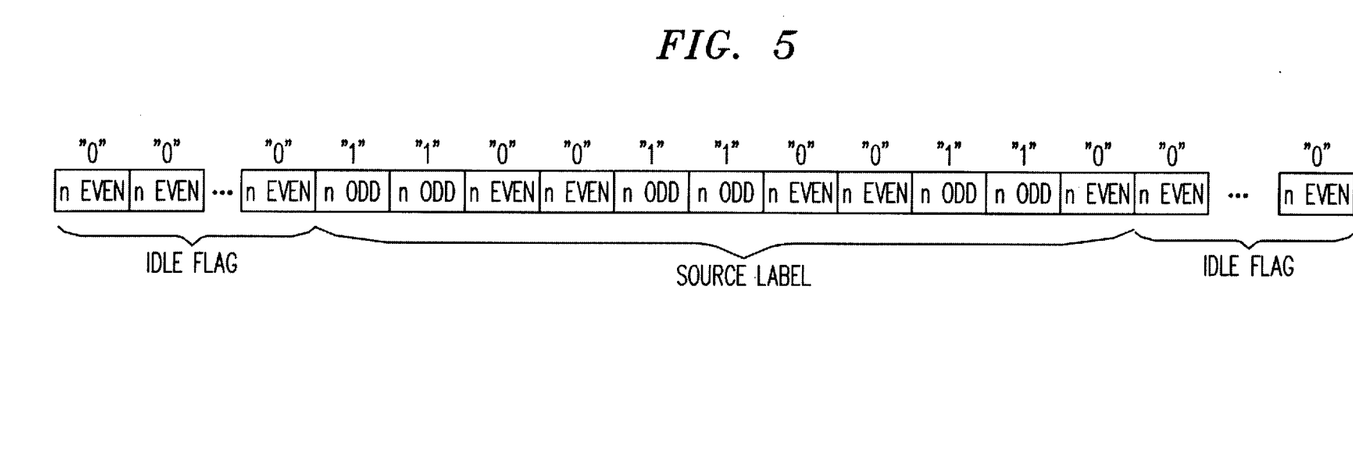
FIG. 5 is an illustration of a frame sequence generated by the apparatus of FIG. 3.

In step 610, source label coder 420 sends a predefined "idle flag" to PAC 410 in step 610. The predefined idle flag is a predefined binary bit pattern for the purpose of synchronizing a receiver to recover the transmitted source label (described below). For illustrative purposes, this idle flag is the bit pattern "0000000000." After sending the idle flag, source label coder 420 sends the "source label" to PAC 410 in step 620. For a 10 msec. frame, the idle flag and the source label can be throughput in the course of 200 msec. In step 630, source label coder 420 monitors an "in progress" signal 412 from PAC 410. If the analog audio signal is still being encoded, source label coder 420 repeats steps 610 and 620 thereby transmitting the idle flag and the source label ad infinitum during the transmission of the compressed digital signal. On the other hand, if encoding of the analog audio signal has ceased, source label coder 420 ends the source label transmission in step 640. FIG. 5 shows a resulting frame sequence from PAC 410.

Figure 6:
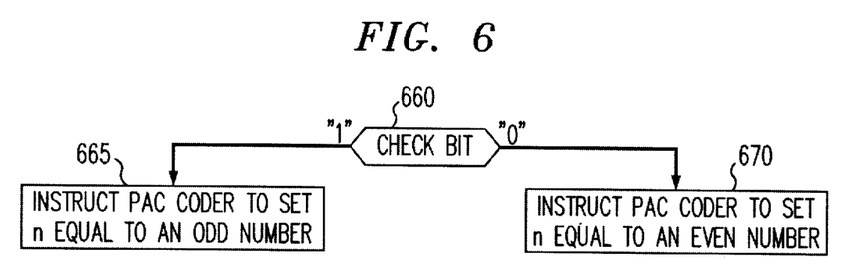
FIG. 6 is a flow diagram of an illustrative method for use within the apparatus of FIG. 3 in accordance with the principles of the invention.

FIG. 6 shows a flow diagram for a method of controlling PAC 410 in accordance with the principles of the invention. For each bit to be transmitted, source level coder 420 determines the value of the bit in step 660. If the value of the bit is equal to "1," then source level coder 420 instructs PAC 410, via a control signal 421, to set the value of n to an odd number of samples in step 665. On the other hand, if the value of the bit is equal to "0," then source level coder 420 instructs PAC 410, via the control signal 421, to set the value of n to an even number in step 670. It is assumed that PAC 410 provides to source label coder 420 the equivalent of a clocking signal 413, which is representative of the start of each frame to, in effect, cause source label coder 420 to "shift-out" the coding for the next bit.

Clearly, numerous tradeoffs can be made in terms of the specific protocol for transmission of the source label, e.g., the methods of synchronization (if any), the partitioning of the number of bits between items such as idle flags (if any), source labels, etc. For example, although the above embodiment described the "source label" as representing a sequence of bits, it should also be realized that other methods for encoding source labels could be used such as alpha-numeric representation of a name. In this case, source label coder 420 could translate the alpha-numeric representation to a sequence of bits, e.g., using an ASCII representation, which are then encoded by appropriate control of PAC 410 as described above. Alternatively, this translation of an alpha-numeric representation to sequence of bits can be functionally included within identification source 415.

Figure 7:
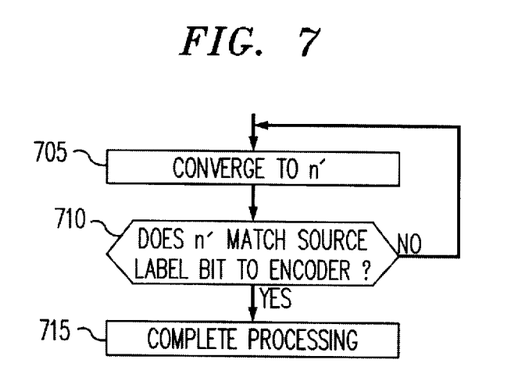
FIG. 7 is a flow diagram of an illustrative method for use with a perceptual audio coder in accordance with the principles of the invention.

Reference should now be made to FIG. 7, which is an illustrative flow diagram of a method for use within PAC 410 in accordance with the principles of the invention. As in the prior art, for each frame of compressed audio PAC 410 converges to a number of samples, herein represented by n', for transmission in step 705. However, in accordance with the principles of the invention, PAC 410 samples the control signal 421 in step 710 to determine if the value of n' matches the coding for the current source label bit. If the coding for the current source label bit is supposed to be "odd" and the value of n' is odd, then PAC 410 simply completes processing of the frame as in the prior art in step 715. Similarly, if the coding for the current source label bit is supposed to be "even" and the value of n' is even, PAC 410, again, completes processing in step 715. However, if the value of n' does not match the coding for the current source label bit then PAC 410 performs another iteration in step 705. As noted earlier, the value of the number of samples in each frame is equally likely to be odd or even, so the above rule leaves the encoding algorithm unaffected half of the time. The repetition of step 705 should, within a small number of repetitions, eventually produce a value n' that matches the coding of the current source level bit.

Figure 8:
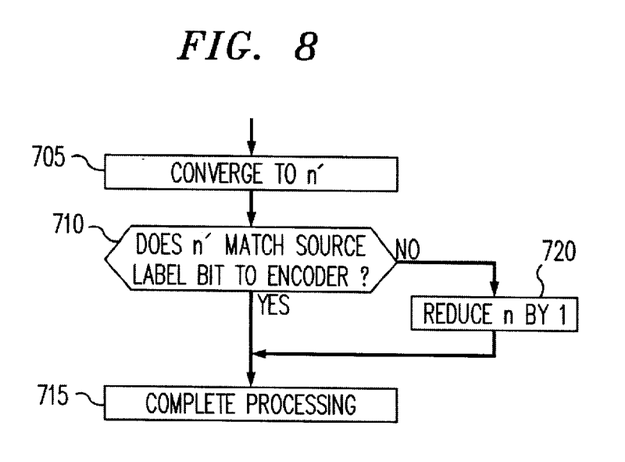
FIG. 8 is a flow diagram of another illustrative method for use with a perceptual audio coder in accordance with the principles of the invention.

However, to ensure convergence to the correct value of n for the other 50% of signal (audio or image) frames, the method of FIG. 8 can be used within PAC 410. The method of FIG. 8 is similar to the method of FIG. 7 except that if the value of n' does not match the coding for the current source label bit in step 710, step 720 is executed, in which PAC 410 alters the value of n' by one, i.e., to n'−1. This reduces the resolution by one sample, i.e., one sample is dropped. For n'<<1 (which is typical) the effect on signal quality is minimal, especially because a perceptual coding algorithm has a built-in hierarchy that steers the process of going from n to n−1, i.e., one could eliminate the component less likely to impact noise audibility (or visibility). (Alternatively, n'+1 could be used, which would increase the resolution but may require re-convergence to a set of n'+1 samples).

It should be noted that in certain classes of perceptual coders, the number of samples, n, is not directly controlled, and the iterative method of FIG. 7 may have to be used. Also, in perceptual coders where n is even by definition, other source level bit definitions, or codebooks, can be specified. For example, a value of n that is a multiple of 4 could be associated with a source level bit value of one, leaving other values of n to be associated with a source level bit value of zero.

Figure 9:
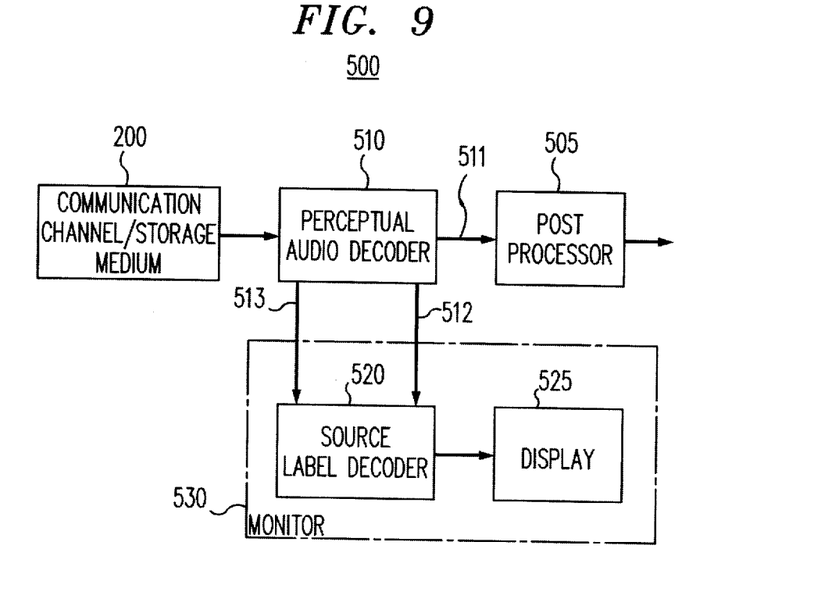
FIG. 9 is an illustrative block diagram of a receiver embodying the principles of the invention.

Turning now to FIG. 9, an illustrative receiver 500 is described in accordance with the principles of the invention. The "source label" is recovered simply by checking the odd or even nature of rn, which is the number of retained coefficients in each received frame as described further below. Similar to FIGS. 1 and 3, receiver 500 includes a number of functional building blocks, e.g., a source label decoder. The functions of any one or more of these building blocks can be carried out using one or more appropriately programmed processors. Except for the inventive concept, receiver 500 functions as in the prior art, as described above. That is, the compressed PAC signal is received from communications channel/storage medium 200 and applied to a perceptual audio decoder 510, which decompresses the compressed PAC signal and outputs a PCM signal 511. The latter is fed into a post-processor 505, which creates an analog representation that is, ideally, identical to analog audio signal 501 of FIG. 3.

Figure 10:
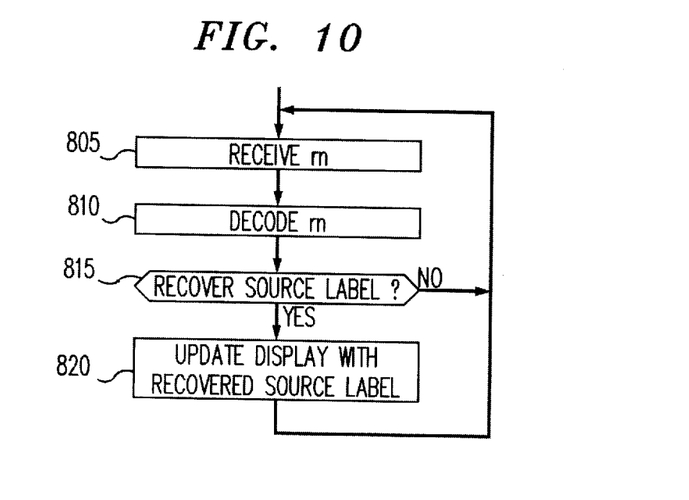
FIG. 10 is a flow diagram of an illustrative method for use within the receiver of FIG. 9.

In accordance with the principles of the invention, perceptual audio decoder 510 provides the number of samples, rn, received in each frame to monitor 530, via signaling 512. In addition, perceptual audio decoder 510 provides a frame valid signal 513 to monitor 530 to, in effect, bit-synchronize monitor 530 to the received encoded source label signal. Monitor 530 comprises display 525 and source label decoder 520, which receives frame valid signal 513 and the number of received samples, rn. Reference should now be made to FIG. 10, which shows an illustrative flow diagram of a method for recovering the "source label" in receiver 500.

In response to a frame valid signal 513, source label decoder 520 receives rn in step 805. In step 810, source label decoder 520 decodes the value of rn in accordance with the above-defined "codebook." That is, if the value of rn is even, source label decoder 520 shifts a "0" into a register (not shown). On the other hand, if the value of rn is odd, source label decoder 520 shifts a "1" into a register (not shown).

In step 815, source label decoder 520 recovers the "source label." In particular, as noted above, the transmission format for the encoded source label comprises an idle flag, which is a sequence of 10 bits of zero value, followed by the 10-bit source label. Consequently, after decoding the bit value in step 810, source label decoder 520 performs a number of evaluations in step 815 depending on whether source label decoder 520 is in an "idle flag" state or a "source label" state.

It is assumed that source label decoder 520 starts in an "idle flag" state. In this state, source label decoder 520 checks if an idle flag, i.e., a sequence of bit values matching the pattern of an idle flag, is detected in step 815. If no idle flag is detected, then source label decoder 520 returns to 805 to receive the next value of rn.

However, once an idle flag is detected, source label decoder 520 switches to the "source label" state and counts the reception of L, the number of bits comprising the "source label." In this example, L is equal to 10 bits. As long as the number of received bits is less than L, source label decoder 520 returns to step 805 to receive the next value of rn. Once the received number of bits is equal to L, source label decoder 520 has recovered the "source label." While the 10 bit sequence could be directly provided to display 525, it is presumed that source label decoder 520 includes a predefined "lookup" table to further translate the 10 bit "source label" to the predetermined alpha-numeric representation, which in this example is "AT&T." Source label decoder 520 updates display 525 with, in effect, the recovered source label (be it binary or alpha-numeric) in step 820. In addition, source label decoder 520 switches back to the "idle flag" state and returns to step 805 to repeat the process. From this description, it can be observed that simply monitoring the value of rn over a number of frames of the received signal easily identifies the source of the received signal.

In the context of the above-described illustrative embodiment, the use of the timevarying number of samples, n, to represent a "source label" is advantageous for a number of reasons. First, in order for the "source label" to be non-invasive, it is desirable (if not necessary) to send the "source label" at a very low data rate. As can be observed, use of the time-varying number of samples, n, effectively sends the "source label" using only 1 bit of information in each frame. Second, use of the time-varying number of samples, n, integrates the "source label" into the compressed digital signal so that the "source label" is a relatively inseparable part of the data signal as it is distributed or copied or retransmitted—any tampering of the value of n also tampers with the quality of the resulting audio signal. As a result of the above, it can be observed that the inventive concept provides a way to integrate a trace, or signature, into a compressed, or coded, portion of a signal to provide, in effect, a passive security approach to protecting information.

There are at least two ways in which the above bits comprising the encoded "source label" may be compromised. The first is through transmission errors. If transmission errors are a problem, these can be addressed by standard means of distinct layers of error protection, e.g., attaching error-detection/correction bits to the encoded source label. Correspondingly, source label decoder 520 is appropriately modified to detect and/or correct the errors. For example, a parity bit can be added to the encoded source label to provide a rudimentary level of error detection. Besides, in this embodiment, the encoded "source label" is constantly repeated, perhaps once every second, thus providing a powerful built-in redundancy for protection of the "source label."

The second way of compromising the encoded "source label" is through human intervention and tampering. While this is definitely an issue, tampering of the, in effect, invisible bits of the encoded "source label" is much more difficult than stripping explicit header information. The chances are very high that if these invisible bits are constantly or periodically attempted to be stripped, or changed, the effect on the decoded audio or image quality will be so significant that the unauthorized use of that signal will be a moot issue. Multi-parity codes would make tampering even less viable.

The foregoing merely illustrates the principles of the invention and it will thus be appreciated that those skilled in the art will be able to devise numerous alternative arrangements which, although not explicitly described herein, embody the principles of the invention and are within its spirit and scope.

Also, although described in the context of a constant bit rate perceptual coder, the inventive concept is applicable to variable bit rate perceptual coders. In addition, the inventive concept is applicable to other encoding applications such as video coding or, for that matter, any encoding application where a parameter of the encoded signal is inextricably coupled to both a) decoding the signal, and b) identifying a source of the encoded signal.

What is claimed:

1. A method for compressing an original signal to provide a compressed signal, the method comprising the steps of:

associating a sequence of data bits with a source label; and compressing the original signal to provide the compressed signal such that the data representing the compressed signal is selected as a function of the original signal and values of ones of the sequence of data bits.

2. A method for compressing an original signal to provide a compressed signal, the method comprising the steps of:

associating a sequence of data bits with a source label; and compressing the original signal to provide a compressed signal representing a sequence of frames, each frame including a number of coefficients that represent some of the data representing the compressed signal, such that in at least some of the frames the respective number of coefficients is selected as a function of values of ones of the sequence data bits associated with the source label.

3. The method of claim 2 wherein the compressing step uses perceptual coding.

4. The method of claim 2 wherein a portion of the associated sequence of data bits includes error protection bits.

5. The method of claim 2 wherein the compressing step includes the steps of:

selecting an even number of coefficients in each frame if a value of ones of the sequence of data bits is a first binary value; and selecting an odd number of coefficients in each frame if a value of ones of the sequence of data bits is the other binary value.

6. A method for embedding data within an information signal, the method comprising the steps of:

perceptually coding an input signal to provide the information signal, which comprises a number of frames, each frame comprising a number of perceptual coding coefficients; and during the coding step adjusting the number of perceptual coding coefficients in at least some of the frames as a function of a bit value of the data such that over the number of frames the data is embedded within the information signal.

7. The method of claim 6 wherein the input signal is an audio signal.

8. The method of claim 6 wherein the input signal is a multi-media signal.

9. A method for integrating a source label into an encoded signal, the method comprising the steps of:

associating a sequence of data bits with the source label;

encoding a signal to provide the encoded signal, where the encoded signal comprises a number of frames, each frame including at least one parameter that is required by a receiver to correctly recover the signal where in at least some of the frames the at least one parameter is also selected as a function of values of ones of the sequence of data bits representing the source label.

10. The method of claim 9 wherein a portion of the sequence of data bits associated with the source label provides error protection.

11. The method of claim 9 wherein the signal represents audio information.

12. The method of claim 9 wherein the signal represents multi-media information.

13. A method for encoding a signal comprising the steps of:

providing a sequence of data bits representative of a source label; and perceptually coding the signal to provide coefficients representing an encoded signal over a sequence of frames such that a number of coefficients in at least some of the frames of the encoded signal is selected as a function of both signal characteristics of the signal and values of ones of the sequence of data bits.

14. A method for use in compressing a signal comprising the steps of:

providing a sequence of data bits representative of a source label; and compressing the signal to provide coefficients representing a compressed signal over a sequence of frames such that a number of coefficients in at least some of the frames of the compressed signal is selected as a function of both signal characteristics of the signal and values of ones of the sequence of data bits.

15. A method for recovering a signal, the method comprising the steps of:

receiving an encoded signal; and decoding the signal to provide both the signal and a source label;

wherein the decoding step includes the steps of
recovering from the encoded signal at least one sequence of coefficients;
using a decompressor for forming the signal as a function of a value of each coefficient; and
using a decoder for forming the source label as a function of the number of coefficients in the sequence.

16. A method for recovering a signal, the method comprising the steps of:

receiving a compressed signal; and decompressing the compressed signal to provide the signal and a source label such that the signal is recovered as a function of individual data values representing the compressed signal and the source label is recovered as a function of a number of data values representing the compressed signal.

17. The method of claim 16 wherein each data value is a coefficient and the compressed signal represents a sequence of frames and the decompressing step includes the steps of:

recovering from each frame of the compressed signal a number of coefficients, each coefficient representing a sample of the signal;

processing each one of the number of coefficients from each frame to provide the signal; and decoding the value of the number of coefficients in each frame to recover the source label.

18. The method of claim 17 wherein the decoding step includes the steps of:

detecting a first binary value if the value of the number of coefficients is odd; and detecting the other binary value if the value of the number of coefficients is even.

19. Apparatus for compressing a signal, the apparatus comprising:

a source of a sequence of data bits representing a source label; and a compressor that compresses the signal to provide a compressed signal such that data representing the compressed signal is selected as a function of the signal and values of ones of the sequence of data bits.

20. Apparatus for compressing a signal, the apparatus comprising:

a source of a sequence of data bits representing a source label; and a compressor that compresses the signal to provide a compressed signal representing a sequence of frames, each frame including a number of coefficients such that in at least some of the frames the respective number of coefficients is selected as a function of values of ones of the sequence data bits associated with the source label.

21. The apparatus of claim 20, wherein the compressor is a perceptual coder.

22. The apparatus of claim 20 wherein a portion of the sequence of data bits representing the source label includes error protection bits.

23. The apparatus of claim 20 wherein the compressor selects an even number of coefficients in each frame if a value of ones of the sequence of data bits is a first binary value, and selects an odd number of coefficients in each frame if a value of ones of the sequence of data bits is the other binary value.

24. Apparatus for compressing a signal, the apparatus comprising:

a source for providing data; and a perceptual coder responsive to the signal to provide a compressed signal, which comprises a number of frames, each frame comprising a number of perceptual coding coefficients where the perceptual coder adjusts the number of perceptual coding coefficients in at least some of the frames as a function of a bit value of the data such that over the number of frames the data is embedded within the information signal.

25. The apparatus of claim 24 wherein the signal is an audio signal.

26. The apparatus of claim 24 wherein the signal is a multi-media signal.

27. Apparatus for integrating a source label into an encoded signal, the apparatus comprising:

a source label encoder for providing a sequence of data bits associated with the source label;

an encoder for encoding a signal to provide the encoded signal, where the encoded signal comprises a number of frames, each frame including at least one parameter that is required by a receiver to correctly recover the signal where in at least some of the frames the at least one parameter is also selected as a function of values of ones of the sequence of data bits associated with the source label.

28. The apparatus of claim 27 wherein a portion of the sequence of data bits associated with the source label provides error protection.

29. The apparatus of claim 27 wherein the signal represents audio information.

30. The apparatus of claim 27 wherein the signal represents multi-media information.

31. Apparatus for encoding a signal, the apparatus comprising:

means for providing a sequence of data bits representative of a source label; and means for perceptually coding the signal to provide coefficients representing an encoded signal over a sequence of frames such that a number of coefficients in at least some of the frames of the encoded signal is selected as a function of both signal characteristics of the signal and values of ones of the sequence of data bits.

32. Apparatus for use in compressing a signal, the apparatus comprising:

means for providing a sequence of data bits representative of a source label; and means for compressing the signal to provide coefficients representing a compressed signal over a sequence of frames such that a number of coefficients in at least some of the frames of the compressed signal is selected as a function of both signal characteristics of the signal and values of ones of the sequence of data bits.

33. Apparatus for recovering a signal, the apparatus comprising:

means for receiving an encoded signal; and means for decoding the signal to provide both the signal and a source label by a) recovering from the encoded signal at least one sequence of coefficients, b) forming the signal by performing a decompression as a function of a value of each coefficient, and c) forming the source label as a function of the number of coefficients in the sequence.

34. Apparatus for recovering a signal, the apparatus comprising:

means for receiving a compressed signal; and means for decompressing the compressed signal to provide the signal and a source label such that the signal is recovered as a function of individual data values representing the compressed signal and the source label is recovered as a function of a number of data values representing the compressed signal.

35. The apparatus of claim 34 wherein each data value is a coefficient and the compressed signal represents a sequence of frames and the decompressing means recovers from each frame of the compressed signal a number of coefficients, each coefficient representing a sample of the signal and processes each one of the number of coefficients from each frame to provide the signal; and further includes a means for decoding the value of the number of coefficients in each frame to recover the source label.

36. The apparatus of claim 35 wherein the means for decoding detects a first binary value if the value of the number of coefficients is odd, and detects the other binary value if the value of the number of coefficients is even.

37. A receiver comprising:

a perceptual decoder for recovering an original signal from a compressed signal, where the compressed signal represents a number of frames, each frame including a number of coefficients that are used to recover the original signal; and a source label decoder responsive to the number of coefficients of each frame for recovering a source label therefrom.

38. The apparatus of claim 37 further comprising a display for showing the source label.

39. Apparatus for encoding a signal comprising:

a source label encoder for providing a sequence of data bits representative of a source label;

a perceptual coder for encoding the signal to provide an encoded signal over a sequence of frames such that a number of coefficients in at least some of the frames of the encoded signal is selected as a function of both signal characteristics of the signal and values of ones of the sequence of data bits.

40. Apparatus for monitoring a signal, the apparatus comprising:

receiver circuitry for receiving a compressed information signal representing a number of frames, each frame including a number of coefficients for use in decompressing the information signal; and monitor circuitry for providing a source label as a function of the value of the number of coefficients in each frame.

41. The apparatus of claim 40 further comprising display circuitry for showing the source label.

42. The apparatus of claim 40 wherein the monitor circuitry includes a codebook where if the value of the number of coefficients for respective frame is even a first binary value is detected for that frame, while if the value of the number of coefficients is odd the other binary value is detected for that frame.

43. The apparatus of claim 40 wherein the monitor circuitry includes a decompressor responsive to the number of coefficients in each frame for decompressing the information signal.

* * * * *